(12) United States Patent
Francis et al.

(10) Patent No.: US 6,362,893 B1
(45) Date of Patent: Mar. 26, 2002

(54) SECURITY PRINTING AND UNLOCKING MECHANISM FOR HIGH SECURITY PRINTERS

(75) Inventors: Robert E. Francis, Richfield; Matthew K. Dunham, Eagan; Gary M. Klinefelter, Eden Prairie; Jon J. Ibs, Minneapolis, all of MI (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

(21) Appl. No.: 09/263,343

(22) Filed: Mar. 5, 1999

Related U.S. Application Data (60) Provisional application No. 60/077,136, filed on Mar. 6, 1998, and provisional application No. 60/082,772, filed on Apr. 23, 1998.

(51) Int. Cl.[7] .............................................. G06K 15/00
(52) U.S. Cl. ..................................... 358/1.14; 358/1.11
(58) Field of Search ............................ 358/1.11, 1.13, 358/1.14, 1.15; 382/101, 11.5, 139, 140, 231, 317; 235/380, 382, 382.5, 375, 381, 492; 380/3, 4, 25, 26; 707/408, 409, 410

(56) References Cited

U.S. PATENT DOCUMENTS

| | | | |
|---|---|---|---|
| 4,855,578 A | * 8/1989 | Hirokawa et al. | 235/380 |
| 4,891,506 A | * 1/1990 | Yoshimatsu | 235/492 |
| 4,968,873 A | * 11/1990 | Dethlott et al. | 235/380 |
| 4,980,542 A | * 12/1990 | Jacuson et al. | 235/375 |
| 5,146,067 A | * 9/1992 | Sloan et al. | 235/381 |
| 5,317,137 A | * 5/1994 | Wilkins | 235/380 |
| 5,336,871 A | 8/1994 | Colgate, Jr. | 235/380 |
| 5,377,269 A | * 12/1994 | Heptig et al. | 380/25 |
| 5,617,528 A | * 4/1997 | Stechmann et al. | 345/326 |
| 5,636,331 A | 6/1997 | Klinefelter et al. | 395/109 |
| 5,720,012 A | * 2/1998 | McVeigh et al. | 358/1.14 |
| 5,737,582 A | * 4/1998 | Fukuzumi | 710/102 |
| 5,832,119 A | * 11/1998 | Rhoads | 382/231 |
| 5,933,322 A | * 8/1999 | Ruch et al. | 361/686 |
| 5,946,672 A | * 8/1999 | Chrosny et al. | 705/410 |

\* cited by examiner

*Primary Examiner*—Gabriel Garcia
(74) *Attorney, Agent, or Firm*—Westman, Champlin & Kelly, P.A.

(57) ABSTRACT

A printer is provided with a smart card encoding device that is externally accessible. The smart card is a key with an integrated circuit including a memory that will retain a discrete password and other digital information. The password on the smart card key must be compared to a password stored in the printer memory before printing operations will be permitted. The digital information in the smart card key memory can include marks or graphics that would indicate that the cards being printed by the printer are secured cards and authorized cards. The information will be printed from the smart card key memory only when the passwords match so that the discrete information on the smart card key can be used for driving the printer for printing this information. The printer is made into a high security printer by permitting the overriding of the password only upon the generating of identical numbers from separated algorithms, one in the printer memory and one at a secure location. An algorithm input is a dynamically changing parameter of the printer, such as the number of print head passes, or the number of cards printed so the algorithmically generated numbers are unique.

5 Claims, 6 Drawing Sheets

SECURITY PRINTING AND UNLOCKING MECHANISM FOR HIGH SECURITY PRINTERS

CROSS REFERENCE TO RELATED APPLICATION

Based on provisional application Ser. No. 60/077,136, filed Mar. 6, 1998 and on provisional application Ser. No. 60/082,772, filed Apr. 23, 1998.

BACKGROUND OF THE INVENTION

The present invention relates to using a smart card key for high security printers and insuring access only when a unique password is provided as well as printing markings from information stored in the smart card key memory.

Smart cards, which are identification cards made from the traditional poly vinyl chloride/polyester cards having an integrated circuit embedded in the card, allowing for information to be stored in the card itself, are widely used. Typically the integrated circuit consists of either a memory or a microprocessor with memory. In order for a smart card to be encoded in the printer, the printer must have a smart card encoder.

One of the problems inherent in identification card printers is that anyone with access to the files or even to a inexpensive commercial drafting software program can recreate the identification card and print forgeries. This problem is particularly acute in locations where the printer, software, files, and other computer hardware are set up in a single area.

SUMMARY OF THE INVENTION

The present invention relates to maintaining security of a printer and its user by having a secure smart card key. The printer is, as shown, an identification card printer and has an externally accessible smart card encoder that can be used for initializing a smart card that forms a key. A further use of the externally accessible smart card encoder is to read the smart card and allow or prevent access. It is also possible to encode smart cards inside the printer, if so desired, by placing a second encoding device in the internal printing path of the printer.

Because a smart card can have a large amount of memory storage, both a digital image (such as a security mark for cards to be printed) and passwords can be stored in the smart card memory. The printers also can have large capacity Electrically Erasable Programmable Read Only Memory (EEPROM), as well as read only memory (ROM).

The first password usage of the smart card key is to enable printing by a selected identification card printer. The second password usage is to enable printing a specialized print panel for a security mark using a stored digital image in the smart card key memory. The ability to enable password protected printing only is provided initially in a computer program for the printer drive computer which converts computer images into digital data for printing cards. The computer program or software includes user interface items for setting passwords, duplicating smart cards, and loading images onto smart card memory. In addition, the selected password would also be stored in the associated identification card printer memory.

A match between the password in printer memory and the password in the smart card key memory is required to enable printing as the basic security feature. Thus, the smart card would act as the only key to allow the printer to print. The ability to store a digital representation of a security mark to be printed onto an identification card being printed by the card printer controlled by the smart card key prevents unauthorized use of the security mark, since accessibility to the mark is limited to the holder of the smart card key with the correct password.

Another aspect of the invention is an algorithmic unlocking mechanism available to users of the smart card key having a high security password feature, in case they ever lost the encoded smart card key or forgot the password. High security as used herein means that the password cannot be easily changed or bypassed. Printers are now equipped with a counter mechanism to count the number of passes that the printhead has made during the operation of the printer, or provide other changing counts. This number can be accessed and displayed on the display of the printer or the number can be printed on an I.D. card in the printer. The counter is a conventional system used in a wide variety of devices. In addition, other changing parameters in a printer can be used for a count, for example, a count of the number of cards printed in the printer can be recorded and used for this invention.

After a selected procedure by the owner of the printer, which verifies ownership of the high security printer, an algorithm is applied to the number generated by the counting mechanism. The algorithm is selected to produce an unlocking number unique to each number of the printer head pass count, a range of printer head pass counts or number of cards printed, as recorded by the counter in that printer. This can be done automatically by the printer if a smart card key used does not have an acceptable password. The count is based on a dynamic parameter unique to that particular printer. A duplicate algorithm to the one in printer memory is kept at a secure location, for example at the premises of the printer manufacturer. The printer manufacturer, after verifying the identity of the owner through a personal identification number, will use the algorithm to generate a one time usable unlocking number.

The owner is then issued this one time usable unlocking number generated from the algorithm at the secure location, which is entered through the host computer in place of the password from the smart card key. The printer will apply or compare the unlocking number generated in printer memory with the number generated from the secure location. If the algorithmically generated number entered by the user matches the algorithmic unlocking number generated in the printer, then the printer will accept and perform the current command given to the printer, such as a command to create a new smart card key or to disable the security feature entirely, or to change the password.

Although the printer memory stores the algorithmic unlocking code, the stored code cannot be used to unlock the printer without the separate algorithmic application, using the same algorithm, but kept at site unrelated to the user, thus protecting the security of the printer. The security value is that the pass count number (or other unique number) from the counter mechanism of the printer is one that the user has no control over, is constantly changing, and cannot be manipulated.

Once the printer has continued to print and the number of printhead passes counted and stored in printer memory has changed, the previously generated unlocking number will no longer match the number produced by the algorithm in the EEPROM of the printer after the change and therefore, the old number will not allow the printer to function.

DETAILED DESCRIPTION OF THE PREFERRED EMBODIMENTS

Smart card encoding is well known in the identification card printer industry. Identification card printers such as the FARGO Cheetah II printer sold by Fargo Electronics of Eden Prairie, Minnesota have the capability of encoding smart cards. However, the Cheetah II printer encodes smart cards internally rather than having the encoder externally accessible. As shown herein the smart card is removable and is thus usable as a key for operating a device that is controlled to perform some operation, such as a printer.

Figure 1:
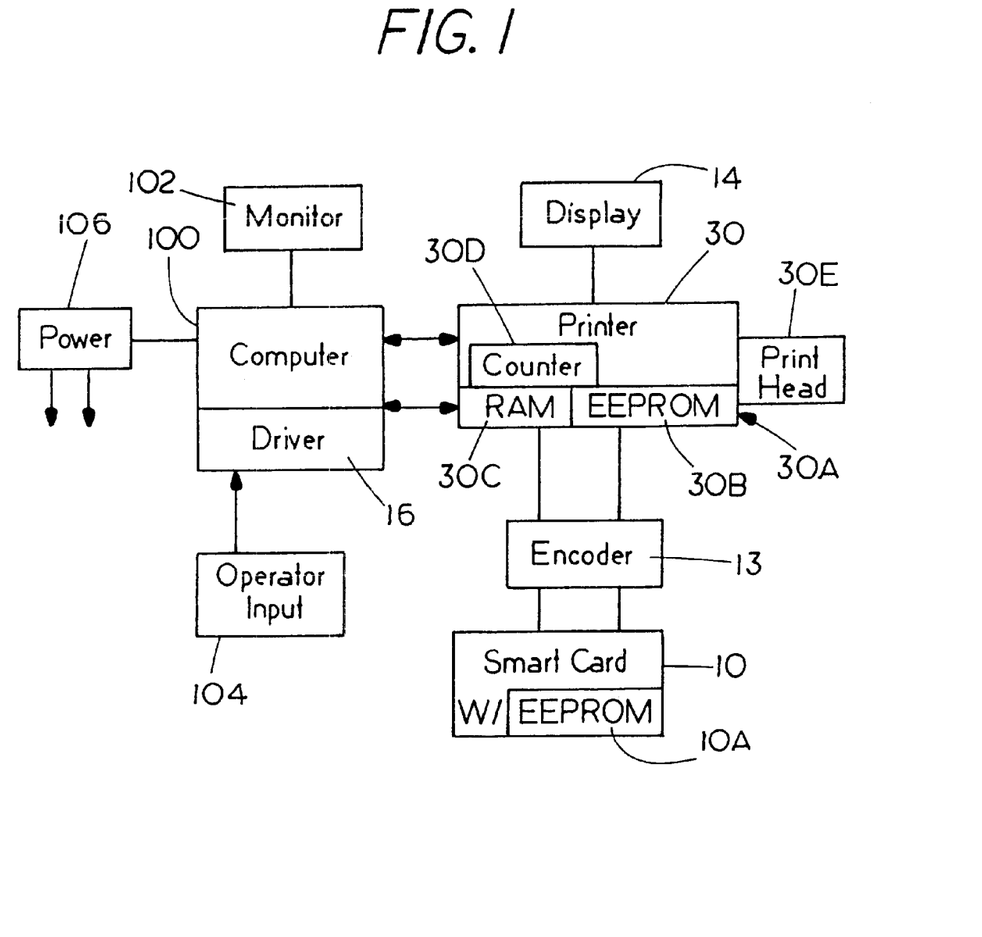
FIG. 1 is a schematic block diagram representation of a high security printer having a smart card key input as attached to a host computer.
Figure 4:
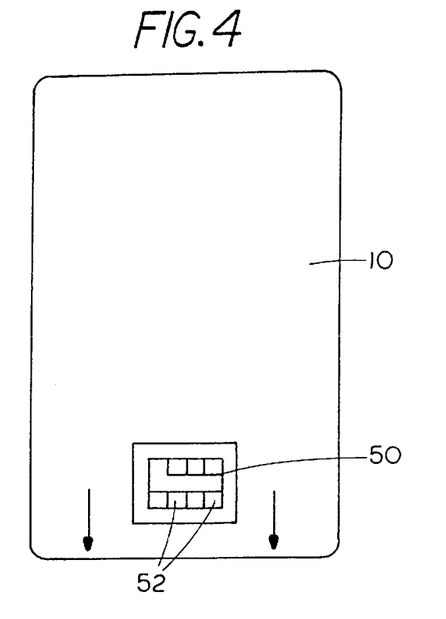
FIG. 4 is a plan view of the smart card key showing an integrated circuit exposed on one side thereof.

In FIG. 1, the general layout of usable, typical components is shown. A computer 100 is connected to a controllable device having a memory, as shown a printer 30, and is used for the initial and subsequent programming. A monitor 102 can be used for the display menus from a software program for encoding a removable memory device key, as shown a smart card key 10, through the input slot on the printer for an encoder 13 as will be explained. Operator inputs from a keyboard 104 are used for selecting the functions, and a power supply 106 is used for powering both the computer 100 and the printer 30. The software for the control of the security features of the present invention is installed in the computer in a normal manner, including a CD to provide the necessary programming for enabling smart card key 10 and providing a selected password that is entered in the smart card key memory 10A. As will be shown, the smart card key is slid into a slot 12 (FIG. 2) in printer 30 and the smart card key 10 contains an embedded integrated circuit 50 (FIG. 4) chip that has integrated circuit contacts accessible from the exterior. The contacts will complete circuits from the printer or computer to the memory on the chip.

The removable memory device, as shown a smart card with external contacts 10, can be a contactless smart card, a radio frequency (RF) identification card, a PCMCIA card, or a compact "flash module" (used currently in digital photography) or any other type of removable memory device. Thus, the encoding device does not need contacts if a contactless removable memory device key is used. This description will show a contact arrangement with for the smart card key.

The computer 100 will be used to select a particular printer 30 that is being used, and in which the card key 10 is inserted. The initializing menu from the program will have prompts that will include a prompt for entering a password selected by the user, and for example up to an eight character password using any standard alphanumeric keyboard characters is entered. Once the password is entered, it can be confirmed by typing it again into a "confirm" password box presented by the menu.

If the smart card key 10 is being used with multiple printers, it can be encoded appropriately with just the password for identification, but if the smart card key 10 is used with only one printer, it will receive and retain in memory the printer serial number, along with the encoded password to a specific smart card key, making all other access cards or key cards created in other printers invalid. If more than one printer is utilized, then each printer can be enabled with the same password.

Once the password has been entered into the computer 100, it will be passed through the printer memory indicated at 30A, from driver software 16 to the card 10, and imprinted in an electrically erasable programmable read only memory (EEPROM) 10A of the chip 50 on the smart card key 10.

Once the smart card key has been programmed with a password, it can only be changed under certain selected circumstances or conditions, and these are controlled as desired from the computer 100, but require information separate from the computer to be operated. Generally it will be necessary to have the card 10 in the printer 30 and then connected to the computer 100 for changing the password and only when god the correct password match between the card memory 10A and printer memory, unless the unlocking algorithmic procedure to be described is followed.

Additionally, if desired, the card printer 30 can be used to print a security image or mark onto cards that are being printed using a special ribbon layer. The printing of the security mark is controlled from a digital image program that is entered in the EEPROM 10A of the smart card key 10. This digital image can be entered from the software program of computer 100 for inputting information into the EEPROM 10A, and the image, such as that shown at 122 in FIG. 5 on an identification card 120 printed on printer 30, can only be viewed when the card is tilted slightly for reflecting light. These security mark images can be made to glow when viewed under an ultraviolet light. The image 122 can be put any place on a card that is to be printed as desired. The storing of the security mark or image in the smart card key memory only insures that such image or mark will only be printed when the correct smart card key is used, since the printer 30 will not operate until the password on that key 10 matches the printer password.

The digital input to print such an image, and other security features are in the EEPROM 10A on the card only. After entry of the information, the inputted digital file for the image is deleted automatically or manually.

The printer driver software 16 can be imbedded in a microprocessor in the printer if desired, and the use of the card 10 for enabling a printer 30 can be done with the printer 30 standing alone, and powered. The printer 30 will normally be used with the computer 100, but the printer includes memory of its own (both ROM and EEPROM). Once the password is entered into the printer memory, the printer memory will perform the needed functions.

Figure 3:
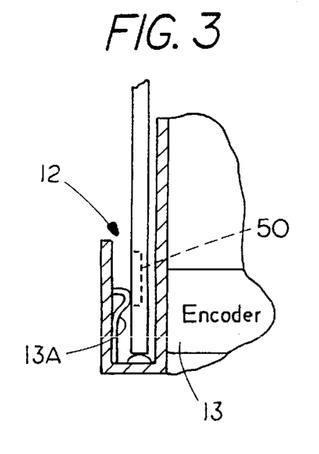
FIG. 3 is a sectional view illustrating schematically a removable memory card key, as shown a smart card, in the encoding device.

Upon receiving a "print" command, the printer memory determines whether or not the security feature has been enabled on the controlled device, as shown the printer 30. If the security feature has been enabled, then the removable memory device card, as shown smart card key 10, must be present in slot 12, and if so, then the memory in the printer will interrogate the card 10 to determine the password in memory on the card and compare it with the password that is in the printer memory. Only if the password matches, will the printer operation be undertaken. FIG. 3 depicts a smart card 10 that is provided with an integrated circuit chip 50 having a password in memory.

Figure 2:
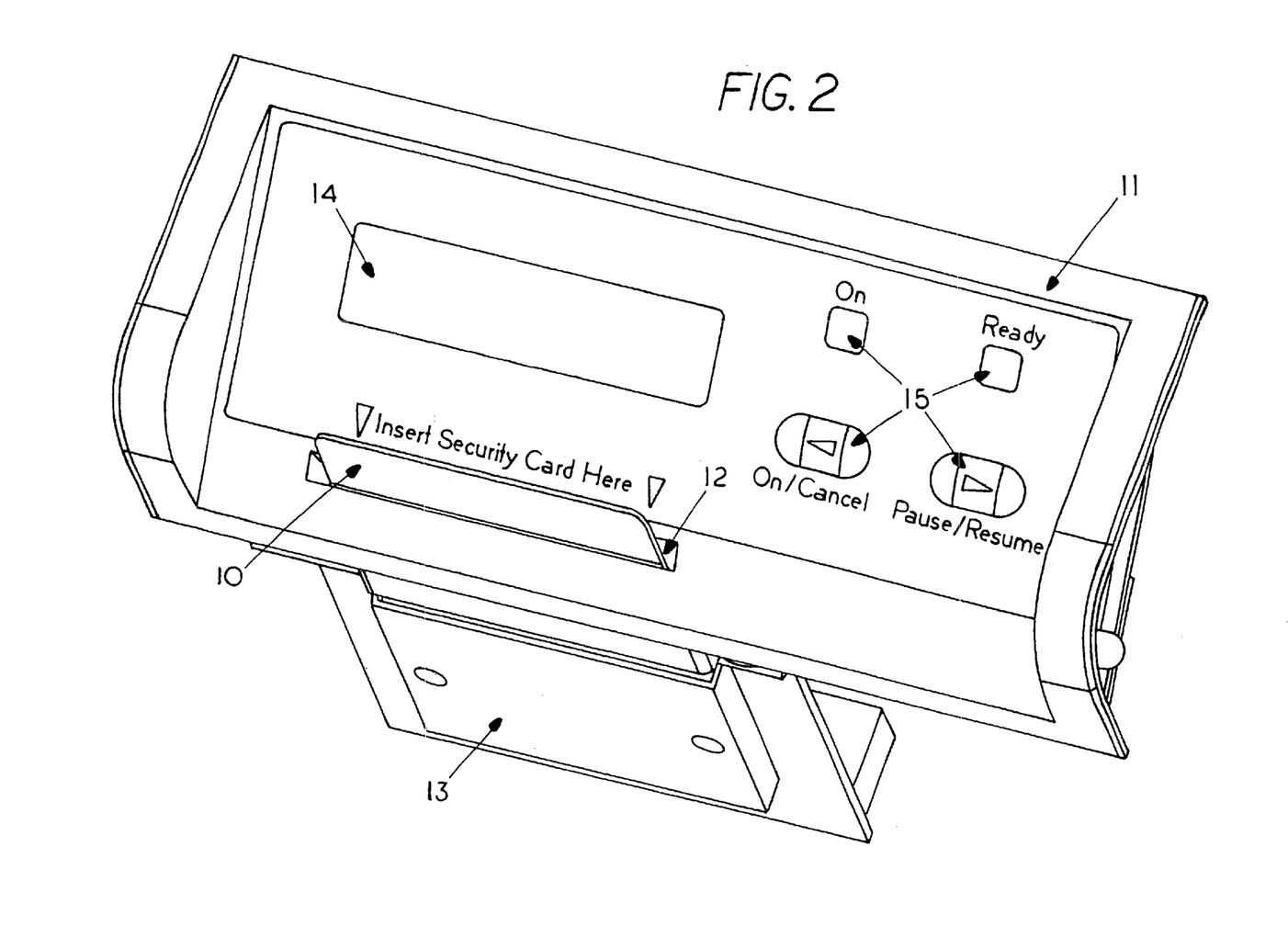
FIG. 2 is a perspective part schematic view of a typical printer having an encoding device on the exterior of and used with the present invention.

A smart card key 10 is placed into slot 12 in printer 30. The encoder 13 used to initialize and read the smart card key 10 is thus externally accessible as shown in FIG. 2. The control panel 11 of the printer 30 has an LCD display 14 and command buttons 15. The smart card key memory chip 50 can be read through external or export contacts 52. The contacts 52 are engaged by spring loaded contacts 13A in the encoder slot. The coupling to the smart card key memory 10A is made as the card is "clicked" into place. Insertion of the smart card key 10 with the integrated circuit facing the correct way through the slot 12 allows contacts to complete circuits to the memory on chip 50, which is encoded electronically.

The contacts 52 are used for initially placing information into the integrated circuit memory of chip 50 as well as reading stored information. The commands are generated in the computer 100 or printer 30 in a normal manner, and for printing can be processed through the printer memory.

Figure 6:
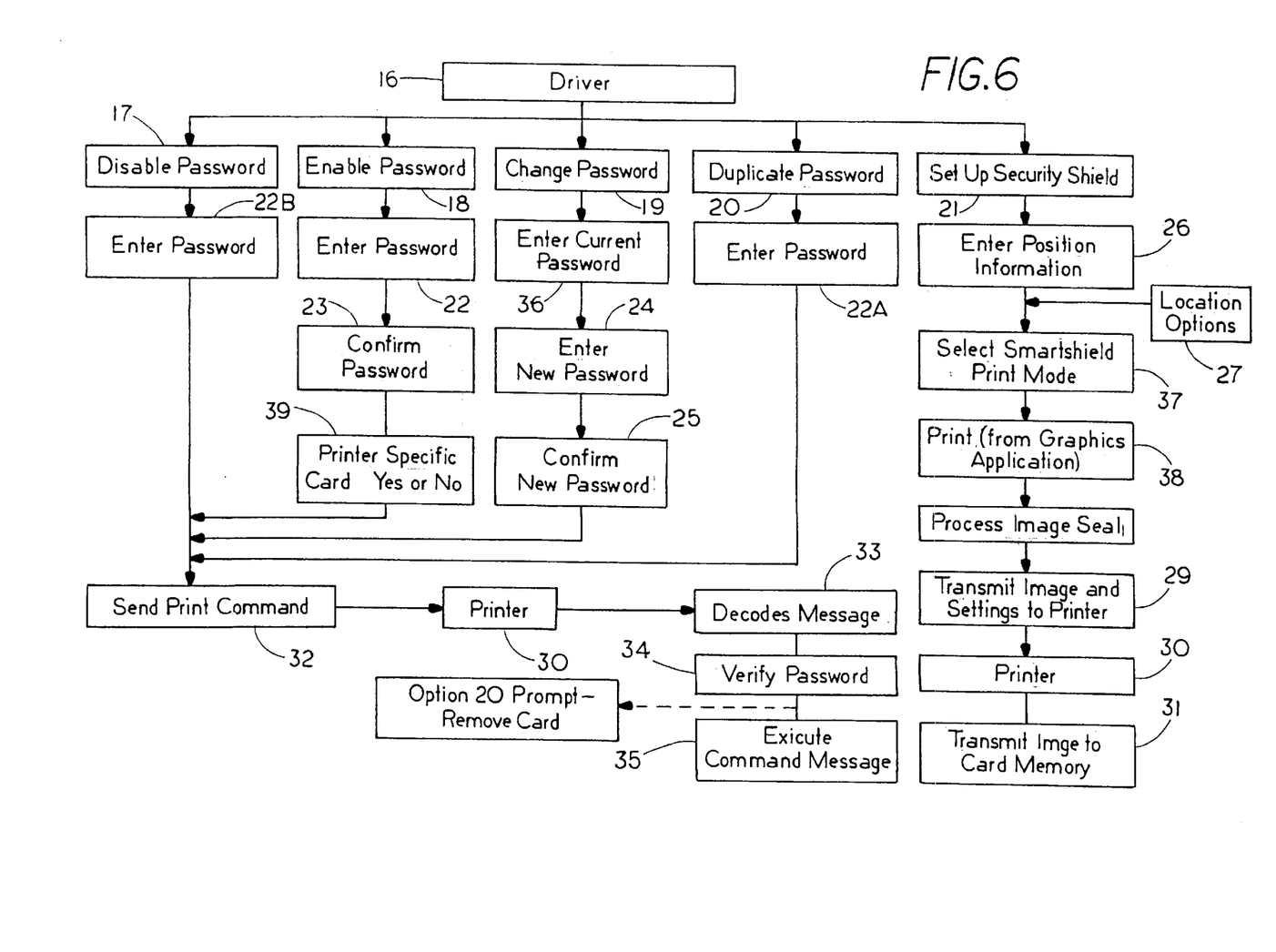
FIG. 6 is an overall flow diagram of operations carried out to accomplish the purposes of the present invention.

Commands are presented in a flow chart in FIG. 6. Each particular printer, in order to interface with any software program run on a computer must have a printer driver 16 to provide the link up to the computer. The driver 16 forming part of computer 100 provides the operator with a menu of choices, as shown, disable password 17, enable password 18, change password 19, duplicate password 20, and set up security shield 21. The operator will choose which menu option is utilized to download corresponding information to the smart card key 10 in a conventional routine.

In order to initially provide a smart card key memory with a digital image of a security mark, such as a logo stored digitally in the memory of the smart card, the operator must choose the "set up security shield" menu step 21. The driver program 16 in the computer controlling the printer then requests position information at step 26 and gives the operator options for positioning the shield or mark at step 27. The positioning is information about the location of the security mark on the identification card 120 in FIG. 5 that is printed in the printer 30.

Figure 5:
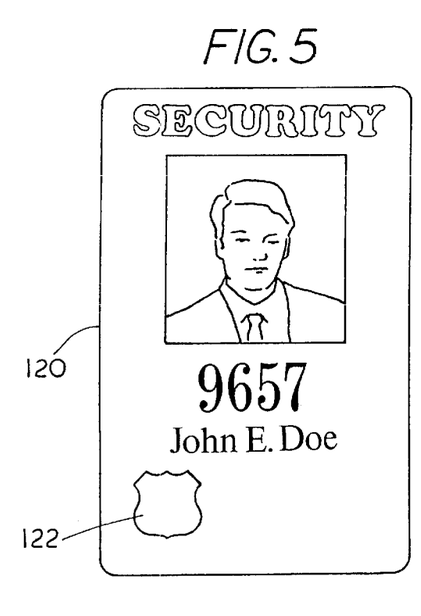
FIG. 5 is a plan view of a typical identification card printed from a printer using the high security arrangement of the present invention.

FIG. 5 shows a printed Identification Card 120 with a digital image or security mark 122 that can be printed in various locations on the identification card. These locations can be varied by changing the location in software located in the computer 100 attached to the printer 30. The number of digital images can also be varied by changing the number of digital images created in software located in the computer attached to the printer.

From a graphics software application in computer 100, where the digital image of a mark has been constructed, the operator selects the "select security shield" step 37 from the printer setup in the graphic application and then chooses print step 38 from the graphics application. The print command step 38 will start the process to transmit both the digital image and the location information to the smart card key 10 memory, rather than commanding the printer to print, when the security shield mode at step 37 has been selected.

Next, the image seal is processed into the appropriate format at step 28, and then transmit the digital image and settings at step 29 to the printer 30. The printer 30 then transmits the image and settings at step 31 to the smart card key integrated circuit memory 10A via the smart card key encoder 13.

It would be possible for a skilled practitioner to create a separate program specifically written to enable the transfer of the digital image data and location data within the teachings of the present invention.

To enable (create) a password or to make changes in the password, other menu options are used at the computer 100, as provided by software in the computer. The password information is to be stored in the memory on the same smart card key 10 as that used for storing the digital image to be printed by printer 30 as just described. In order to place a password onto the smart card, key 10, the "enable password" menu option 18 must be chosen. The computer driver program then prompts the operator to enter the selected password at step 22 and confirm the password at step 23 as was previously mentioned.

The operator then has the option to make the smart card specific to a single printer by choosing the "yes" option of the printer specific card prompt at step 39. The printer 30 has an Electrical Erasable Programmable Read Only Memory (EEPROM) that contains a serial number for that printer that can also be encoded into the smart card key memory through encoder 13. Once encoded to the key memory, the printer serial number would be compared in the same manner as the passwords, which would prevent the printer 30 from printing unless both the password and the serial number matched. The password from the smart card key 10 is then transmitted as a send command 32 to the printer 30 where the printer memory decodes the message at step 33, verifies the password, step 34, and executes the command message at step 35 if the printer is enabled by the correct password.

To change the password, the operator must insert the smart card key 10 into the encoder 13, then select the "change password" menu option 19 from the software in the computer 100. The current password must be entered as shown by step 36. The operator is prompted to enter the new password as at step 24 and confirm the new password as at step 25. The new password is then transmitted as a send command at step 32 to the printer 30 where the printer decodes the message at step 33, verifies the password, step 34, and executes the command message step 35.

To duplicate the password as shown at menu option 20, the operator must insert the originally encoded smart card key 10 into the encoder 13, then select the "duplicate password" menu option 20. The current password must be entered at step 22A to verify that operation is authorized and the change can be made. The password is then transmitted as a send command at step 32 to the printer 30 where the printer memory decodes the message at step 33, and verifies the password at step 34. Then the printer driver prompts the operator to remove the original smart card key 10 and place a new smart card key 10 into the encoder 13. The printer 30 then executes the command message at step 35. The changes can be made only if the original password on the smart card key 10 has been entered.

To disable the password, the operator must insert the smart card key 10 into the encoder 13, then select the "disable password" menu option 17 at the computer 100. The current password must be entered at step 22B and the password to be disabled is then transmitted as a send command 32 to the printer 30 where the printer decodes the message at step 33, verifies the password at step 34, and executes the command message at step 35.

It would be clear to a skilled practitioner in the art that these commands could be structured in a variety of permutations. Any of those known permutations may be used as long as security is maintained.

Once the smart card key 10 has been encoded, the password encoded on the smart card key 10 can be stored in the printer EEPROM 30B. The EEPROM 30B on the printer 30 also contains the unique serial number for that printer. When an operator has encoded the smart card key 10 and wants to print, the operator reinserts the smart card key 10 into the encoder 13. The printer 30 then copies the information contained in the integrated circuit memory of the Smart Card to the printer's Random Accessible Memory (RAM) 30A. The printer RAM 30A then compares the password and, if the option of making the smart card key 10 specific to one printer has been chosen, the RAM compares the serial number on smart card key 10 to the password and serial number retained in the printer EEPROM 30B. If the passwords in both memory locations (card and printer) match, then the printer 30 will enable the print commands to proceed. The printer will continue to allow the print commands until the smart card key 10 is removed from encoder 13. Once the smart card key 10 is removed from the encoder 13, the same process has to be repeated for the printer 30 to start printing again.

When an operator has encoded the smart card key 10 with a digital image such as a logo and wants to print identification cards that contain the logo such as that shown at 120 in FIG. 5, the operator must reinsert the smart card key 10 into the encoder 13. The printer 30 then copies the information contained in the integrated circuit memory on the smart card key 10 to the printer's Random Accessible Memory (RAM) 30C. The printer memory then compares the passwords and, if included, the serial number from card key 10 to the passwords and serial number retained in the printer EEPROM. If correct, the printer stores the digital image and the location information transmitted from the smart card key 10 in the RAM memory. The printer is programmed to check to see if the ribbon with the specialized security mark panel is loaded into the printer 30, and if the correct ribbon is loaded, and if the passwords in both memory locations match, the printer will commence the print cycle. The printer will continue to allow the print commands until the smart card key 10 is removed from encoder 13. Once the smart card key 10 is removed from the encoder, the same process would need be repeated for the printer 30 to start printing again.

A practitioner skilled in the art would be able to discern that saving the password in the computer or not saving the password at all and requiring the operator to enter the password each time that the operator used the printer 30 could accomplish the same increase in security of the printer 30 within the scope of the present invention.

A counting device or counter 30D (FIG. 1) is added to either a circuit board in the printer or to the print head mechanism itself for counting the number of passes of the print head 30E during printing or counting the number of cards. An electronic counting device or counter in printer memory would be the preferred embodiment but other counting devices such as a mechanical counting device could be used for recording a changing event as printing progresses.

Figure 7:
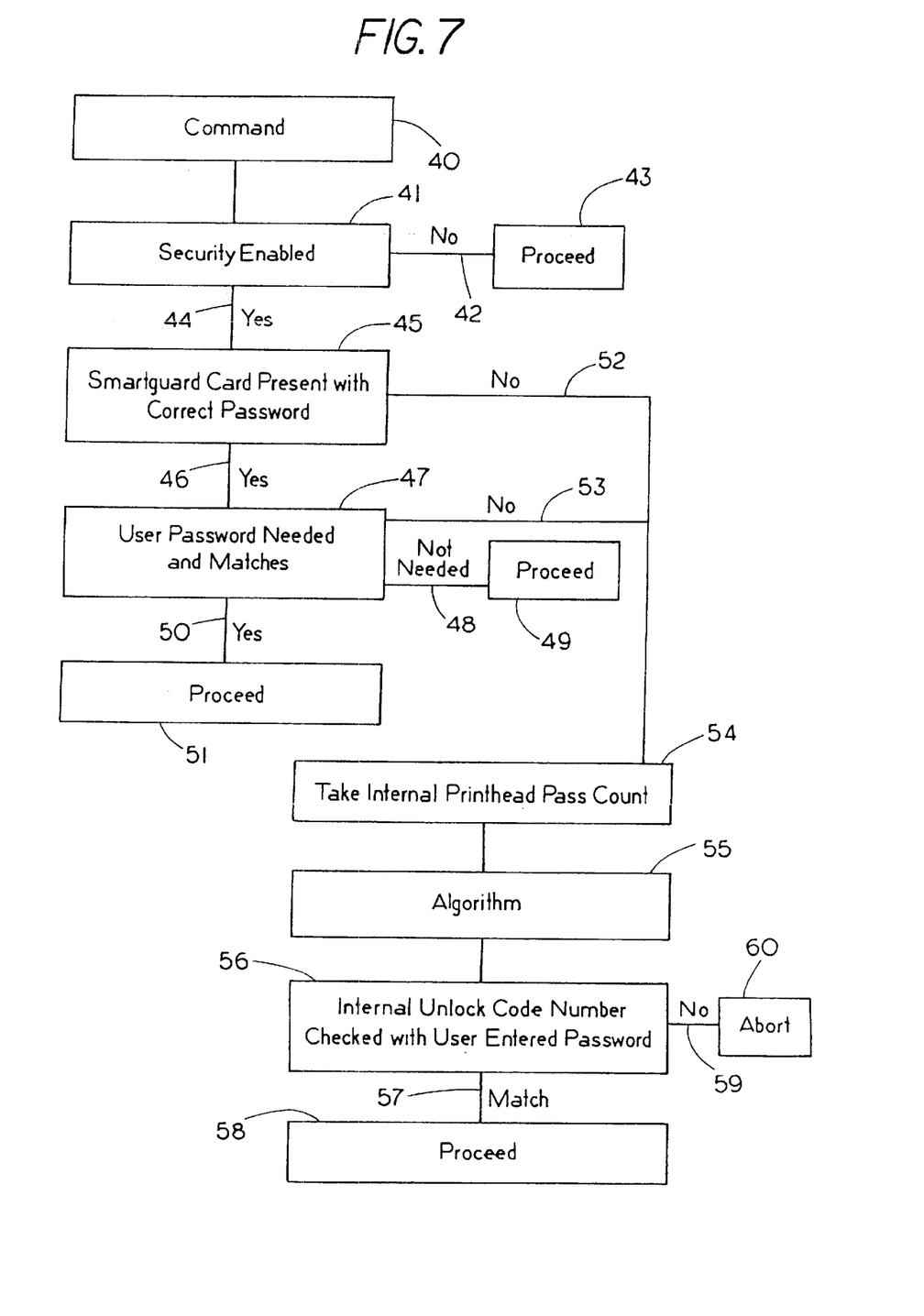
FIG. 7 is a flow diagram for enabling printing of a security mark on an identification card based on a digital image stored in the smart card key.
Figure 8:
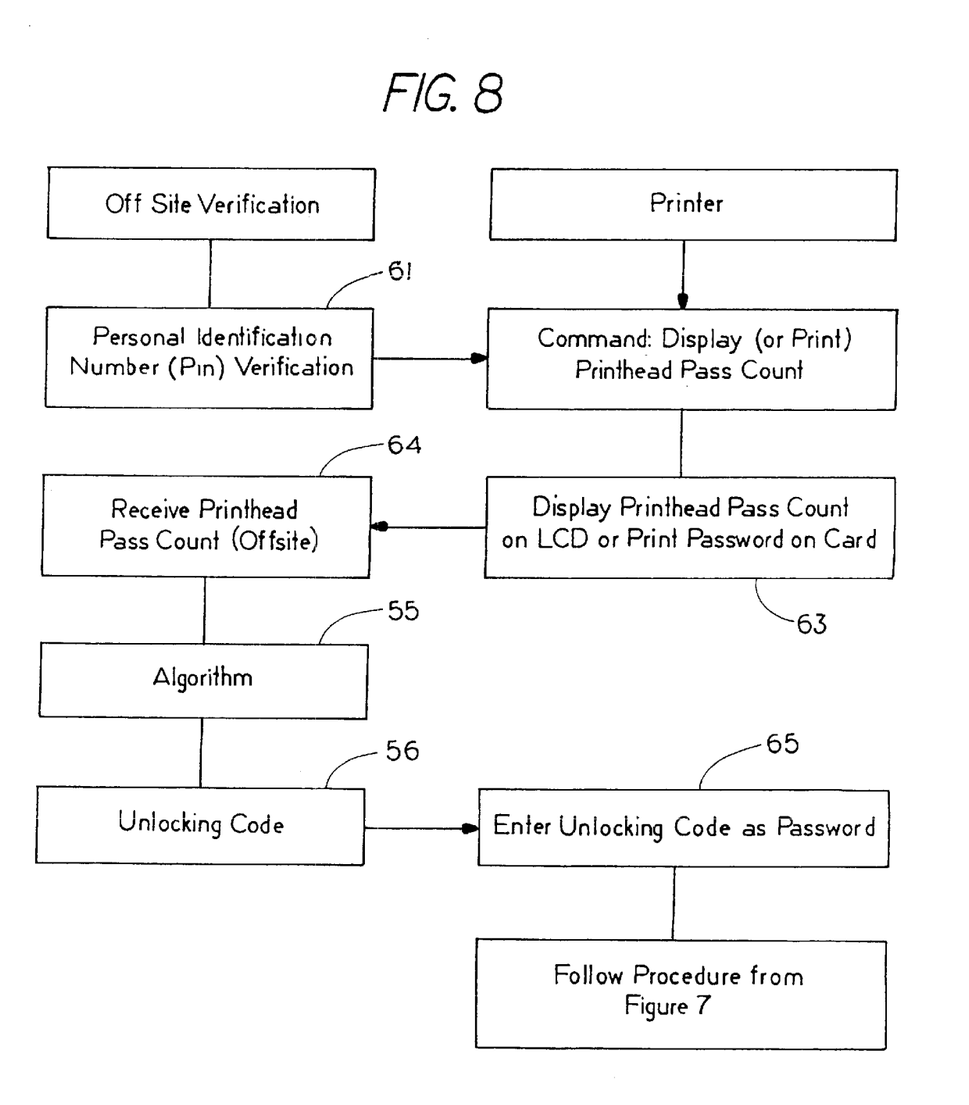
FIG. 8 is a flow diagram of an off-site verification procedure for the high security printer of the present invention.

In every instance where the printer is given a command, the process shown in FIG. 7 occurs. The command step 40 is given to the printer 30. The printer 30 memory determines if the printer is security enabled at step 41. If the answer is no at step 42, (no security check is needed) the printer 30 proceeds with the command as at 43. If the answer is yes at step 44, then the printer 30 determines if the smart card key 10 is inserted into the slot 12 of the encoder 13 and if the correct password is encoded onto the smart card key at step 45. If the answer is yes at 46, the printer memory then determines if the user password is needed at step 47 and matches the password in the printer EEPROM 30B. If the password is not needed as at step 48, the printer proceeds with the command given, step 49. If the password is needed and matches, then the printer proceeds with the command at step 51.

If the printer memory determines that the smart card key 10 is not inserted into the slot 12 or if the incorrect password is encoded onto the smart card key memory, at 45, or if the user password is needed as at step 47 and the password on key 10 does not match the password in the printer EEPROM, then the printer 30 automatically runs an internal check of the print head pass count at step 54 using the counter. The printer algorithmically processes the print head pass count at step 45 using an algorithm stored in printer memory to get a unique internal unlocking code number. The printer memory then compares the internal unlocking code number to the user entered password on the key 10 at step 56.

This separate code number can also be derived from a duplicate algorithm kept apart from the printer, which also uses count of the events counted by the printer. If there is a match at step 57 between the internal unlocking code number and the user entered password (or unlocking number), then the printer will proceed with the command at step 58. If there is not a match at step 59 between the printer internal unlocking code number and the user entered password, then the printer will abort the command at step 60 and remain locked.

In the event that a user loses the encoded smart card key or misplaces their password, the unlocking process in FIG. 10 is followed. As part of the present invention, users encoding the smart card key or enabling the password protection features of the printer contact an off-site verification location and can send a Personal Identification Number (PIN). PIN numbers are commonly used in such applications as ATM machines and for credit cards. PIN applications are well known in the art. Once a PIN number has been established, the user would have to verify the PIN number at step 61 or give some unrefutable evidence that the user is entitled to use that printer before any assistance in unlocking the printer would be given. When the user identification process is completed, the user is given a command from the off-site location that allows the print head pass count (or other count) to be displayed on a display 14 or printed on an identification card in the printer, at step 62. The print head pass count is then displayed at step 63 either on the LCD display 14 or on the identification card. The user relays the count selected to the off-site location at step 64. The off-site location is anticipated to be the headquarters of the printer manufacturer. The print head pass count is then put through the same algorithm as at step 55 which is contained in the printer. The resulting unlocking number at step 56 is then given back to the printer operator 65. The printer operator then enters the unlocking number in place of the user password which starts the internal printer process as described above.

In summary, for unlocking a printer in case of a lost card, the memory in the printer contains an algorithm, which is a number generating algorithm that will provide a discrete output number based upon an input number the value of which outside the control the operator of the printer, such as a count of the number of print passes or cards printed, which count can be done with an internal counter in the printer. These numbers can be shown on a display on the printer, upon a command from the operator (which command also may be known only to the manufacturer) and using the algorithm and the variable number, the printer can generate a dynamically changing security number or password.

If the password on the smart card key does not match the password in printer memory, the memory in the printer can provide the algorithmically generated password automatically to see if it matches an override password. The override can be inputted from the computer 100, if desired, and if the algorithmically generated number in the printer is matched, then the printer can be operated, and can be used without a password or a new smart card key can be encoded with a new password that is generated.

The algorithm used is discrete for each particular count, and this permits a party that has lost a smart card key or password to call to the manufacturer, (or other off-site locations) who has the algorithm in memory identified by the printer serial number, and upon identification of the user, the user can provide the count that is used as an algorithm input, and the off-site manufacturer then can run the algorithm with that discrete count inputted and provide a number that can be used as a separate auxiliary security unlock. This number can be put into a smart card key that would be provided to the user, or can be generated in the computer 100 for comparison with the algorithmically generated number from the printer memory using the same algorithm as that used by the manufacturer. A match then also will disable the security system for operation and for encoding and accepting a new password on a new removable memory device or smart card key.

The algorithm can he a normal number generating algorithm based upon an input number that varies or changes as the printer is used.

The removable memory device or card can be provided with a password in memory so it is a key to permit operation of a printer or another controllable device that performs operations. The removable memory device or card is a key to operating the controllable device and permits operation only when the card is associated with the externally accessible encoder and a password match is made.

Although the present invention has been described with reference to preferred embodiments, workers skilled in the art will recognize that changes may be made in form and detail without departing from the spirit and scope of the invention.

What is claimed is:

1. A process of controlling printing of a digital image to be printed onto a substrate in a printer comprising creating the digital image on a drive computer for the printer, transmitting the digital image to an encoding device coupled to the printer, encoding the digital image onto a removable memory carrying device having an integrated circuit memory for receiving and holding the digital image, encoding an algorithm into the memory of the printer, using the algorithm for generating a number as a function of an input of a discrete number, the number generated by the algorithm providing a secondary password for comparison with inputs to the printer memory, and providing the same algorithm as in the printer memory at an off-site location, counting a discrete dynamically changing parameter in a counter in the printer as printing operations proceed to provide a counter output, using the counter output for an input to the algorithm in the printer memory and for an input to the same algorithm off-site to provide matching numbers based upon dynamically changing conditions of the printer.

2. A process for unlocking a password protected secure identification card printer comprising providing an identification card printer that contains memory having an algorithm for comparing an internal password with an externally inputted password stored in printer memory that generates a number as a function of an input number, providing the same algorithm in a memory at a location secured separately from said printer, counting events of the printer that change dynamically as printing operations occur, determining the count of such events, and generating numbers separately using the algorithm in the printer and the algorithm at the location secured separately from the printer, and comparing such numbers as passwords for unlocking printer operations when a match occurs.

3. The process of claim 2 further including a drive computer for the printer, inputting the number generated at the algorithm secured separately from the printer into the computer for comparison with the number generated by the printer memory for determining if printing operations should proceed.

4. The process of claim 2 and generating a number from the algorithm in the printer memory whenever a print command is provided to the printer and the printer remains unenabled.

5. A process for unlocking a password protected secure printer comprising providing a printer that contains memory for comparing an internal password with an externally inputted password stored in printer memory that generates a number as a function of an input number, providing the same algorithm in a memory at a location secured from said printer, counting events of the printer that change dynamically as printing operations occur, the events consisting of one of the group of a number of printing head passes made by a printer at a selected time and a number representing items printed by the printer at a selected time, determining the count of such events, and generating numbers separately using the algorithm in the printer and the algorithm at the location secured from the printer, and comparing such numbers as passwords for unlocking printer operations when a match occurs.

* * * * *

UNITED STATES PATENT AND TRADEMARK OFFICE
CERTIFICATE OF CORRECTION

PATENT NO. : 6,362,893 B1  Page 1 of 1
DATED : March 26, 2002
INVENTOR(S) : Francis et al.

It is certified that error appears in the above-identified patent and that said Letters Patent is hereby corrected as shown below:

<u>Title page,</u>
Item [75], Inventors, "MI" should be -- MN --.
Item [56], References Cited, U.S. PATENT DOCUMENTS, add:

-- 4,864,618    9/1989       Wright et al. .....................380/51
   4,775,246    10/1988      Edelmann et al. .................380/23
   5,325,152    6/1994       Higashio et al. ................. 355/202
   4,157,784    6/1979       Grottrup et al. ..................235/491 --

Add: -- FOREIGN PATENT DOCUMENTS

-- EP  0  718  802  A2      12/1995      EP
   WO 97/15032              4/1997       WIPO
   58027257                 2/1983       JP --

Signed and Sealed this

Twenty-third Day of September, 2003

JAMES E. ROGAN
*Director of the United States Patent and Trademark Office*